(No Model.)

W. Z. HARMON.
TWINE HOLDER FOR BINDING CORN, GRAIN, &c.

No. 565,167. Patented Aug. 4, 1896.

Witnesses.
A. Ruppert,
G. B. Towle

Inventor.
Wm. Z. Harmon
Per
Thomas R. Simpson
atty

UNITED STATES PATENT OFFICE.

WILLIAM ZEDICK HARMON, OF HARMONSBURG, PENNSYLVANIA.

TWINE-HOLDER FOR BINDING CORN, GRAIN, &c.

SPECIFICATION forming part of Letters Patent No. 565,167, dated August 4, 1896.

Application filed December 17, 1895. Serial No. 572,616. (No model.)

*To all whom it may concern:*

Be it known that I, WILLIAM ZEDICK HARMON, a citizen of the United States, residing at Harmonsburg, in the county of Crawford and State of Pennsylvania, have invented certain new and useful Improvements in Twine-Holders for Binding Corn, Grain, Cane, or Straw; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to hold the twine securely while tying shocks of corn, small grain, sugar-cane, and straw, while ordinarily the binder is compelled to hold both ends of the twine with his hands during the time of making the tie. Otherwise the twine slips and a secure tie is not made.

Figure 1:
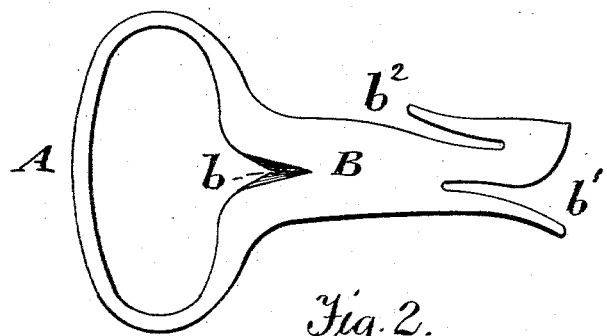
Figure 2:
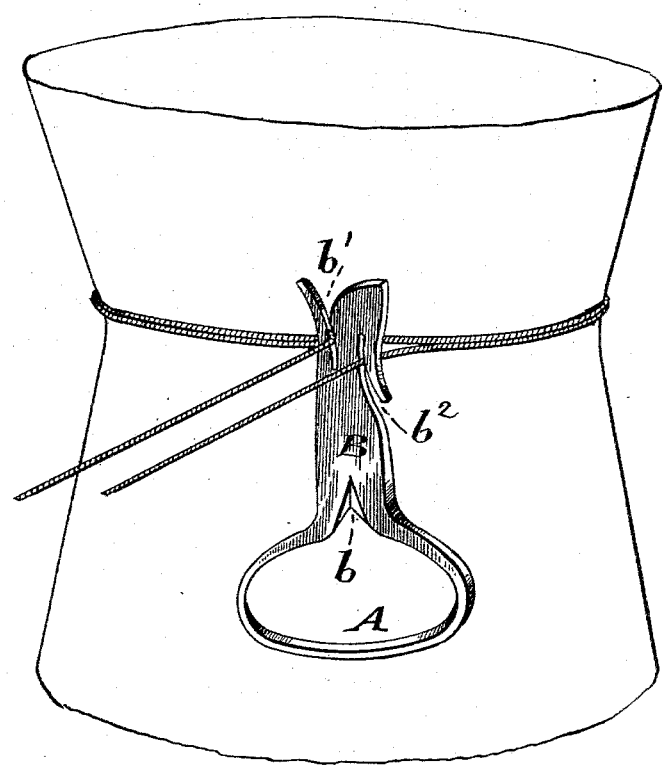

Figure 1 of the drawings is a plan view of my twine-holder, and Fig. 2 a perspective view showing the twine applied.

In the drawings, A represents the loop-handle, which is held by the operator, as shown in Fig. 2 of the drawings.

B is the body of the holder, provided, where it joins the handle, with a wedge-cutter $b$ for severing the twine whenever it may be needed. At the front end of the body B, I make two open but reversed wedge-grooves $b'$ $b^2$, in which the ends of the twine may be jammed.

The mode of operation is as follows: The person who is binding the shock first wedges one end of the twine in the groove $b'$, where it is securely held while he wraps the string around the shock as often as he deems necessary, pulling it up taut, and then wedging the free end of the twine in the groove $b^2$. He is now at liberty to use his hands to make a perfect tie to prevent any possibility of slipping and to draw the straw or fodder into a compact mass. By a slight twist of the holder, first one way and then oppositely, the ends of twine are released from the holder.

By a little practice a laborer learns to make the ties much more expeditiously than with the hand alone, and much more perfectly.

What I claim as new is—

A twine-holder having a loop-handle at one end and two open, reversed wedge-grooves at the other whereby it may be used in the manner described as and for the purposes set forth.

In testimony whereof I affix my signature in presence of two witnesses.

WILLIAM ZEDICK HARMON.

Witnesses:
A. B. RICHMOND,
M. L. MCGUIGAN.